April 19, 1960    S. B. SPRACKLEN ET AL    2,933,600
SELECTIVE INFRA-RED GAS ANALYZER
Filed June 28, 1954    4 Sheets-Sheet 2

INVENTORS
STANFORD B. SPRACKLEN
STERLING T. MARTIN
LOUIS J. ROGERS
CHARLES W. CAPEHART
RAYMOND B. FERTIG
CHARLES G. FELLOWS
BY
William F. Messinger
ATTORNEY April 19, 1960

S. B. SPRACKLEN ET AL 2,933,600

SELECTIVE INFRA-RED GAS ANALYZER

Filed June 28, 1954

INVENTORS
STANFORD B. SPRACKLEN
STERLING T. MARTIN
LOUIS J. ROGERS
CHARLES W. CAPEHART
RAYMOND B. FERTIG
CHARLES G. FELLOWS

BY
William J. Meringer
ATTORNEY

United States Patent Office 2,933,600
Patented Apr. 19, 1960

2,933,600

SELECTIVE INFRA-RED GAS ANALYZER

Stanford B. Spracklen, St. Albans, Sterling T. Martin, Charleston, Louis J. Rogers, Dunbar, Charles W. Capehart, Charleston, Raymond B. Fertig, St. Albans, and Charles G. Fellows, Alum Creek, W. Va., assignors to Union Carbide Corporation, a corporation of New York Application June 28, 1954, Serial No. 439,632

10 Claims. (Cl. 250—43.5)

The present invention relates to an improved method and apparatus for analyzing a sample gas and indicating the percentage of a specific infra-red radiation absorbing component of the sample gas.

In the industrial production of gases it has long been a problem to provide a gas analyzer of suitable efficiency, sensitivity, simplicity, and ruggedness which can indicate the percentage of a specific component, or mixtures of components, in a gaseous mixture containing varying percentages of the specific component gas as well as varying amounts of contaminant or impurity components.

It has long been known that many gases have the ability to absorb quantities of infra-red energy and thereby undergo a pressure change; and many gas analyzers based on this infra-red energy absorption-pressure change principle have been proposed heretofore.

Since each infra-red absorbing gas has a unique infra-red absorption spectrum, many of which overlap in wave length; it is a difficult problem to provide an analyzer which will be responsive only to the infra-red absorption spectrum of the specific gas component or components for which analysis is desired, which will hereinafter be referred to as the "specific gas."

Many prior selective infra-red gas analyzing methods and apparatus are disclosed in an article by W. G. Fastie et al. in Journal of the Optical Society of America, vol. 37, No. 10, pp. 762–768 (1947). In that article, prior methods of analysis were discussed together with the difficulties encountered when employing each of them. On page 765 an improved infra-red analyzing method and apparatus were disclosed employing two filter cells, one containing oxygen and the other 100% of the specific gas for which analysis is desired. This system employs a type of selective negative filtering system wherein one optical path passes to a thermopile detector all of the source energy minus that absorbed by the selective gas in the filter cell and all absorbing gases (specific and contaminant gases) in the sample gas mixture, while the other optical path passes to another thermopile detector all of the source energy minus that absorbed by all absorbing gas components of the sample gas mixture. Thus, any variation in specific gas component in the sample gas will not be detected on the first optical path side due to the negative filtering effect of the large quantity of specific gas on that side, but will be detected on the other optical path side where no self-filtering specific gas is present. Consequently, the differential signal generated across these thermopiles, connected to develop opposed signals, is amplified and recorded as being the concentration of specific component in the sample gas. Such a system, although it constitutes one of the best selective infra-red analyzer systems known heretofore, presents certain inherent difficulties. Among the difficulties encountered when employing such a system the following are of critical importance: When there are variations in the concentration of contaminant infra-red absorbing gases in the sample gas, and these contaminant gases have absorption spectra which overlap that of the specific gas, there is an error in the indicated concentration of specific gas. In addition, the system is responsive to the extremely small temperature differences of a differential thermopile, while the overall temperature gradient experienced by the thermopiles due to external conditions can be in excess of this value.

It is, therefore, the main object of the present invention to provide an improved and more accurate method and apparatus, employing infra-red energy, for measuring the concentration of a specific gas component in a sample gas mixture which may contain infra-red-absorbing contaminant gas components having absorption spectra which may overlap the absorption spectrum of the specific gas component under analysis.

Another object is to provide such an analyzer system which has two substantially identical optical paths thereby providing an analyzer which is highly accurate and sensitive.

A further object is to provide such a system having a null-balance condition of operation.

A still further object is to provide such a system having means for compensating for absorption-time differences in the infra-red energy absorption of different gases.

Other aims and advantages of the present invention will be apparent from the following description and appended claims.

In accordance with the present invention a method of and apparatus for selective infra-red gas analysis is provided wherein a quantity of infra-red energy, emitted over a band including wave lengths absorbed by the specific gas to be analyzed for, is passed through two physically identical optical systems. Each optical system comprises a series of bodies of gases arranged so that the infra-red radiation can successively pass through them. One system comprises first a body of sample gas to be analyzed, a second body of specific gas which is the minimum (or sensitizing) amount required to create an output signal unbalance equal to that required for full scale range of measurement, a third body of specific gas component admixed with some proportion of one or more non-absorbing gases in a confined space which will generate a pressure proportional to the amount of infra-red energy passing through to and absorbed by the specific gas component of this body of gas. The other system comprises first a body of sample gas to be analyzed, a second body of contaminant gas which is the minimum quantity sufficient to mask out the effect of any variation in the contaminant gas on the measurement, and a third body of specific gas admixed with some proportion of one or more non-absorbing gases, which will develop a pressure proportional to the amount of infra-red energy passing through to and absorbed by the specific gas component of this body of gas. A measurement of the differential between pressures generated in the third bodies of gas in each optical system can be calibrated in percentage of specific gas component in the sample gas mixture.

By employing such a method of specific gas component analysis, any variation in the contaminant gas component of the gas sample will not effect the specific gas component measurement, and analysis with high accuracy and sensitivity can be obtained.

It has been found necessary to add a sufficient amount of a non-absorbing gas, such as nitrogen, argon, and the like, to each body of gas discussed above (with the exception of the sample gas) to bring the pressure of each body of gas uniformly up to a value of about one atmosphere. Such a procedure is advisable to bring the total pressure in each cell up to atmospheric pressure for ease of operation.

The magnitude of the differential pressure generated between the two bodies of specific measuring gas referred to above, one in each optical path, is theoretically proportional to the quantity of specific gas component in the sample gas.

It has been found, however, that all infra-red absorbing gases do not have the same infra-red energy time-absorption rate. Different bodies of gas are employed in the reference cell R in one optical path, and the compensating cell C in the other optical path, thereby presenting absorption-time phase differences which are complicated by the fact that the infra-red energy beams in both optical paths are chopped to produce a pulsating differential pressure output, which can more readily be amplified than a unidirectional output.

It has been found that, by a proper phasing of the chopping of the infra-red energy beam in the respective optical paths, the decrease in sensitivity introduced into the system, due to the infra-red absorption-time phase differences of the different gases, may be eliminated to produce an accurate method of analysis.

This is accomplished by dynamically adjusting the phasing of the chopping action in the respective paths to make up for any time lead or lag in the infra-red absorption by the gases of the paths. For example, should a body of gas in one system require an additional incremental period to absorb infra-red energy, then the chopping of the energy in that system should be carried out during that increment of time prior to the chopping of the infra-red energy passing through the other parallel optical system containing gases having a faster absorption time.

It has been found that, if compensated in this manner, the energy beams in both optical systems will be in time phase by the time they reach the measuring cells to there develop the differential pressure, since they have already passed through the gases having different infra-red absorption times. Then the differential output developed between the two bodies of measuring gas is truly proportional to the specific gas component of the sample gas.

It has also been found that greater stability can be achieved in an infra-red gas analysis system based on a null-balance method rather than on a deflection method of operation. To attain this stability, the method of the present invention employs an energy feedback loop, whereby any change in the differential signal developed (produced by change in specific component of the sample gas) between the measuring cells is fed back in the form of infra-red energy in the proper direction (increase or decrease) to accomplish a return of the system to a null-balance condition of operation which will result in the development of a zero signal as long as the specific gas component of the sample gas remains at that value.

Novel apparatus for performing the analytical method of the invention is shown in the attached drawings, wherein.

Figure 1:
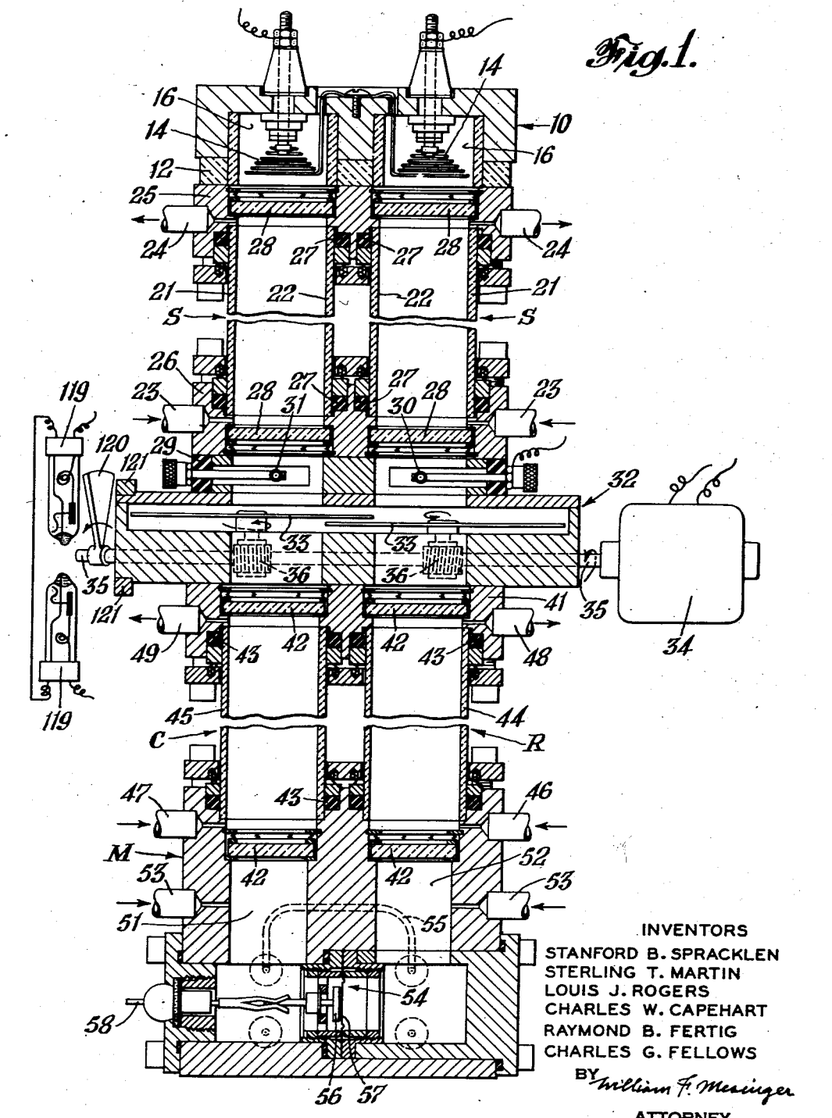
Fig. 1 is an elevational sectional view of the cell block arrangement of an infra-red analyzer embodying the invention.

As shown in Fig. 1 of the drawing, an analyzer cell block is provided having two parallel optical paths comprising a series of cells in each path.

Figure 2:
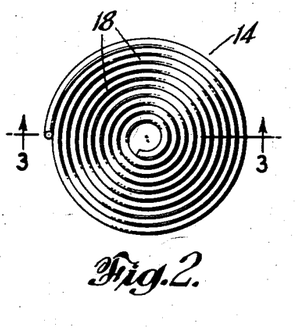
Fig. 2 is a plan view of infra-red heating coil construction for use in the infra-red analyzer of the invention; in the main source of infra-red radiation.
Figures 3, 4:
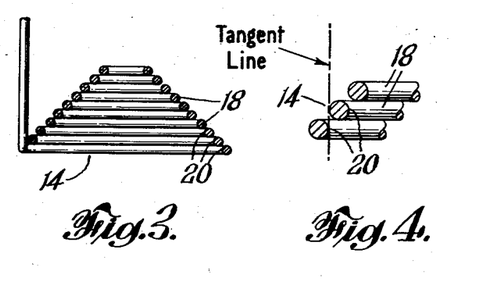
Fig. 3 is a sectional view along the line 3—3 of Fig. 2.
Fig. 4 is an enlarged fragmentary view of a portion of Fig. 3, showing the volute arrangement of successive layers of the coil winding.

At the top of the cell block assembly a filament block 10 is provided for housing the filaments for the two parallel optical paths. Heat and electrical insulators 12, of refractory or similar material, are provided to insulate block 10 from the rest of the cell block assembly. A source of infra-red energy 14 is provided in each of the inserts 16 of filament block 10 and comprises a voluted conical filament. As shown in Figs. 2–4 of the drawing, the filament which has high infra-red energy emitting surface properties, such as nickel-chromium alloy and the like, is wound in multiple windings 18 of decreasing diameter to form a filament conical in shape. Each layer of filament winding is evenly spaced from the previous layer in the axial direction and the external diameter of each successive layer is substantially equal to the internal diameter of the preceding layer. In this manner, the density of energy emitted from the filament is uniform in cross-section in the downward axial direction. It has been found that for a maximum density of emitted energy, a right circular conical voluted filament having a 90° apex should be employed. Such a filament has 41.4% more effective heating surface than a flat surface of equivalent outside diameter has, so that for the same diameter and temperature, 41.4% more radiant energy is made available for the measurement.

The energy emitted from and passing downwardly into the two parallel optical paths from the internal surfaces 20 of each of the conical filaments 14 is adjusted to be equal. The first cells entered by infra-red energy from the sources are the sample gas cells, S, which are preferably connected in parallel to insure that identical samples of the gas to be continuously analyzed are present in both optical paths. Each sample gas cell S comprises a cylindrical tube 21 having internal walls 22 which are preferably lined with gold leaf or the like to increase infra-red reflection and to provide high thermal conductivity and low corrosion characteristics, sample gas inlet conduits 23 and sample gas outlet conduits 24.

Sample cell end blocks 25 and 26 are provided to seal off the ends of sample gas cell tubes 21 and resilient annular O rings 27 are provided to insure gas tight seals between each end of the cell tubes 21 and the blocks 25 and 26. At each end of sample gas cell tubes 21 end glasses or windows 28, of calcium fluoride, sodium chloride and the like, are provided to seal off the tubes 21 to prevent the escape of sample gas while still allowing the passages of infra-red energy through the cell tubes 21.

Figure 5:
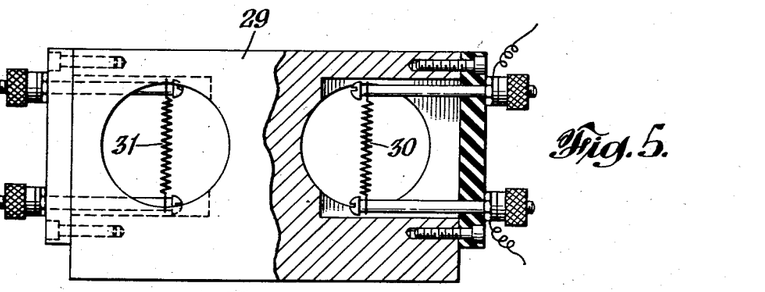
Fig. 5 is a plan view, partly broken away to show internal construction, of the filament block shown in the analyzer apparatus of Fig. 1.

In the cell block assembly, below the sample gas end block 26, is provided null-balance filament block 29 containing feedback filament 30 for emitting energy in one optical path in proportion to the fed back signal to restore the analyzer to a null-balance condition. A second "dummy" (unenergized) filament 31 or an adjustable trimmer, as shown in Fig. 5, is provided in the other optical path to provide identical optical interference in both optical paths.

Figure 6:
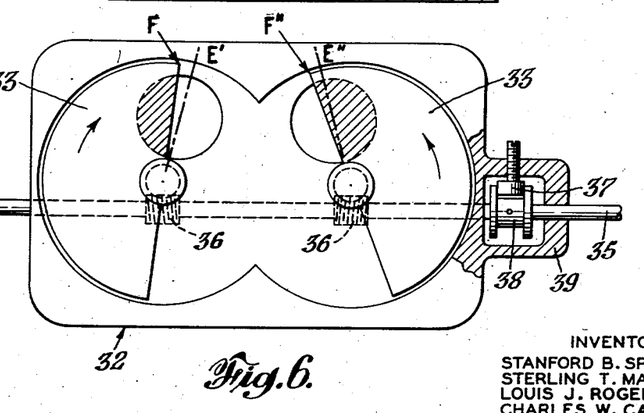
Fig. 6 is a plan view of the beam chopper block employed in the analyzer apparatus of Fig. 1, part having been broken away.

Below null-balance filament block 26 in the cell block assembly is provided beam chopper block 32 having a semicircular rotating disc 33 in each optical path for intermittently chopping the infra-red energy passing through the two optical paths and giving a pulsating outlet signal from the system which can more easily be amplified. A synchronous motor 34 is provided for driving rotating discs 33 through shaft 35 and helical gear means 36. As shown in detail in Fig. 6, means is provided for dynamically adjusting the rotationwise position of the two semicircular plates 33 relative to each other.

An eccentric cam 37 is retained in rotating sleeve 38 secured to shaft 35 and housed in portion 39 of block 32 and permits the dynamic positioning of plates 33 while the plates are rotating. For example, assuming that the plates are phased with relative positions E'—E"; turning of cam 37 will cause a longitudinal displacement of shaft 35 to the right while plates 33 are chopping, which can bring about a dephasing of plates 33 to give relative positions such as F'—F" of Fig. 6.

Below the beam chopper block 32 there is provided the compensating-reference cell arrangement. End block 41, contacting the chopper block 32, contains end glasses or windows 42 and O rings 43 for sealing off the upper ends of the reference cell tube 44 and compensating cell tube 45, which are substantially identical with the sample gas cells described above. Gas inlet means 46 and 47 and gas outlet means 48 and 49 are provided for passing gas into and withdrawing gas from the reference cell R and compensating cell C, respectively. End windows and O rings are similarly provided at the lower end of the reference and compensating cells for sealing purposes.

Figure 8:
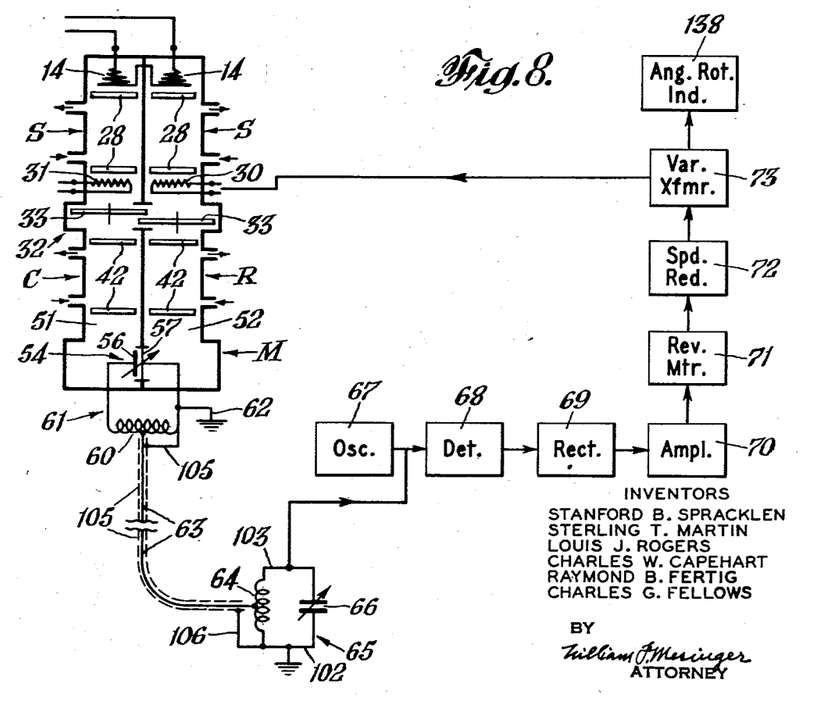
Fig. 8 is a schematic view of the infra-red gas analyzer system of the invention.

The lower ends of the reference and compensating cell tubes 44 and 45 are mounted in measuring cell block M which contains two measuring cells 51 and 52, having gas inlet means 53, and separated by the diaphragm of a condenser microphone 54. A capillary tube 55 connects measuring cells 51 and 52 to maintain the gas in both cells at equal static pressure. Condenser microphone 54 comprises two electrodes (one stationary 56, and the other a metal diaphragm 57 grounded to the cell block assembly) the capacitance between these electrodes being responsive to the differential pressure between the gases in the two measuring cells. Thus, variations in pressure differential between the gases in measuring cells 51 and 52 is transmitted into a proportional variation in capacity between the electrodes 56 and 57, which is taken off across element 58 and ground (the metal measuring cell block itself) to an external circuit, as shown in Figs. 8 and 9 of the drawings.

The external electrical circuit across the condenser microphone 54 contains an inductor 60 which forms a tank circuit 61, one end of which is grounded through line 62. A shielded transmission line 63 is connected to a point along inductor 60 and thereby "link-couples" the remotely located tank circuit 61 to the inductor 64 of tank circuit 65, containing condenser 66. This "link-coupling" is made between points of equal impedance level in both tank circuits. As shown schematically in Fig. 8 of the drawing, a feedback loop is provided between the condenser microphone 54 and the feedback filament 30 of the analyzer cell block assembly. This feedback loop comprises an electro-mechanical system and contains an electron-coupled oscillator circuit 67, the second tank circuit 65, a detector circuit 68, rectifier circuit 69, amplifier circuit 70, reversible motor 71, speed reducer 72 and variable transformer 73.

Figure 9:
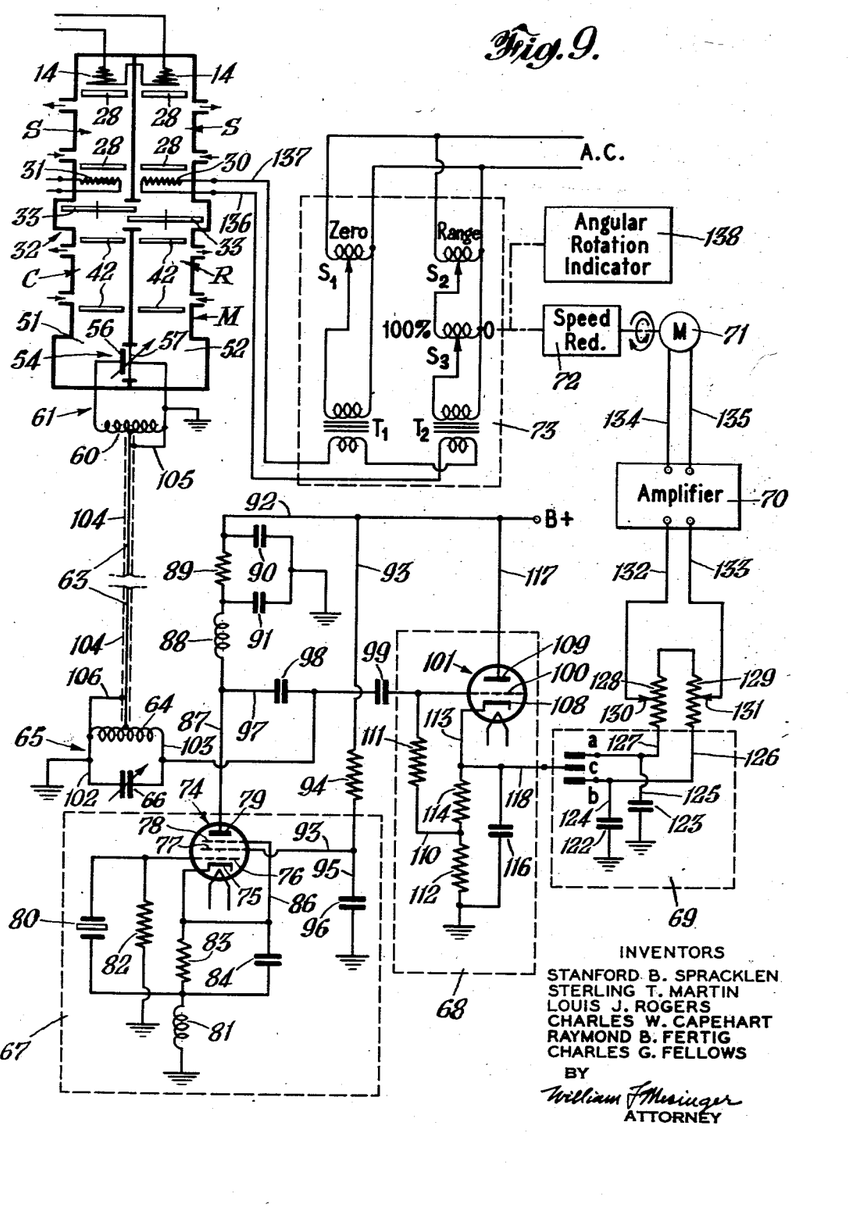
Fig. 9 is an electrical circuit diagram of the infra-red gas analyzer system of Fig. 8.

Referring more specifically to Fig. 9 of the drawings, a crystal-controlled, electron-coupled oscillator circuit 67 is provided comprising a multi-element electronic tube 74 having a cathode 75, a control grid 76, a screen grid 77, a suppressor 78 and a plate 79. The oscillator circuit is completed through cathode 75, control grid 76 and screen grid 77 of tube 74. A crystal 80 is employed in the control grid circuit and is in series with a radio frequency choke 81 to ground. In parallel with this combination is a grid resistor 82 to ground. The cathode circuit comprises a parallel combination of resistor 83 and condenser 84, in series with radio frequency choke 81 to ground. The screen grid circuit comprises line 93 connecting resistor 94 to a positive battery voltage, and line 95 connecting condenser 96, to ground.

Coupled to the oscillator section of tube 74 by the electron stream is an additional section consisting of suppressor 78 and plate 79 of tube 74. Plate circuit 87 comprises a series combination of radio frequency choke 88 and resistor 89. Condensers 90 and 91 by-pass resistor 89 and choke 88, respectively, to ground. The high potential side of resistor 89 is connected through line 92 to a source B+ of positive battery voltage. Suppressor grid 77 is maintained at cathode potential through line 86.

The output of the electron-coupled oscillator is taken from the plate 79 through line 97 containing coupling condenser 98, tank circuit 65, coupling condenser 99 and leads to the control grid 100 of electron tube 101 of a detector circuit 68.

The output voltage of the electron-coupled oscillator circuit contains fundamental and harmonic frequency components and this voltage appears across tank circuit 65 from line 97 to ground. All voltage components not shorted to ground through the tank circuit are applied to the control grid 100 of tube 101 of the detector circuit 68.

The tank circuit 65 comprises parallel connection of variable condenser 66 and inductor 64, in lines 102 and 103, respectively, with parameters so chosen and adjusted to provide a resonance condition at a frequency corresponding to either the fundamental or a harmonic of the oscillator frequency.

It has been found, however, that when this circuit is tuned to resonance at a higher harmonic of the crystal frequency a many-fold increase in sensitivity of the overall system is realized.

In the transducer head tank circuit 61 containing parallel-connected inductor 60 and variable condenser microphone 54, the parameters are chosen to give a slightly off resonance condition and are substantially identical to the parameters of tank circuit 65.

Tank circuit 61 is link-coupled to tank circuit 65 through shielded cable 63 which joins corresponding points of inductor 60 and inductor 64. Sheath 104 of cable 63 is grounded for shielding purposes through lines 105 and 106. Accordingly, any tuning change in tank circuit 61 of the remote transducer head accomplishes a detuning of tank circuit 65 and changes that portion of the output of the electron-coupled oscillator circuit which is allowed to reach the input grid 100 of the detector circuit 68.

The detector circuit containing electron tube 101 having control grid 100, cathode 108, and plate 109 is of the "infinite impedance" detector type. The grid circuit 110 contains a series combination of resistors 111 and 112 to ground. The cathode circuit 113 contains a series combination of resistors 114 and 112 to ground. Cathode by-pass condenser 116 is in parallel with the series combination of resistors 114 and 112. The plate 109 is connected directly through line 117 to source of positive direct current voltage B+. The demodulated output of the system is developed at the cathode of the tube 101 and is taken off through line 118.

In operation, the output of the crystal-controlled electron-coupled oscillator having components at the fundamental and harmonic frequencies is impressed across tank circuit 65. The lumped tank circuit, comprising tank 65 and the reflected impedance of tank circuit 61 coupled to tank 65 by link coupling, is tuned to slightly off resonant condition at either the fundamental, or preferably a higher harmonic, frequency component of the oscillator output. Thus, with the effective tank circuit tuned to resonate at the third harmonic, for example, the fundamental and all other harmonic components will be short-circuited to ground through tank 65 and impedance will be offered by the tank circuit 65 only to the third harmonic component. Accordingly, only the voltage of the third harmonic component, modulated due to the effect of tuning changes in the condenser microphone 54 of tank circuit 61, will be fed to the input control grid 100 of the detector circuit 68. After demodulation, the voltage output, appearing from output line 118 to ground, will consist of the modulating voltage wave and will represent tuning changes in the capacitance of condenser microphone 54.

It has been found that by employing a crystal-controlled electron-coupled oscillator a high degree of frequency stability is realized in the system. Additionally, a relatively high power output with high frequency stability is achieved in the system of the invention by employing an electron-coupled oscillator circuit. Circuit stability is further enhanced by the isolation of the change in tuning from the radio frequency energy driving source (the crystal oscillator) by means of the electron-coupled arrangement. In this manner, a change in tuning of the tank circuit 65 affects the crystal oscillator but little, but the link-coupling arrangement between the two tank circuits allows a remotely-located sensing unit 61 to react upon the control circuit as though it were a part of it and not remote from it. The link-coupling arrangement, being insensitive to tuning changes per se, provides a trouble-free and noise-free means of connecting the remotely-linked, highly sensitive circuit to the main body of the electronic system with little or no loss in sensitivity or increase in noise.

The detector 101 is preferably of the "infinite impedance" type and accordingly does not destroy the sensitivity of the measurement due to loading effects.

It has been found that the tuning response curve of the system is such as to give a very linear output voltage as a function of tuning which may be of either the modulated or unmodulated variety. The sensitivity of measurement, of capacities for example, is in the order of $10^{-17}$ farads in modulated systems or $10^{-14}$ farads in non-modulated systems, with a conversion efficiency in the order of 250 volts per micromicrofarad of change in a sensing element of 50 micromicrofarad total capacity.

The electronic coupling circuit, oscillator circuit, and detector circuits described herein are disclosed in U.S. Patent No. 2,831,166, granted April 15, 1958.

The demodulated output voltage, appearing across output line 118 to ground of the detector circuit 68, is fed to input electrode $c$ of a mechanical rectifier circuit 69. The mechanical rectifier, as shown in Figs. 1 and 9 of the drawings, comprises two electrodes $a$ and $b$ which alternately conduct through electrode $c$. Two mercury switches 119 may serve as electrodes $a$ and $b$ and the required alternating contacts may comprise a rotating switch 120 which is shafted to synchronously driven rotating shaft 35 of the beam chopper 32 and interrupts the magnetic field from magnets 121 to switches 119. In this manner rectification of the fed back signal in synchronization with beam chopping of the infra-red energy is assured. Condensers 122 and 123 are provided to ground, through lines 124 and 125, respectively, from electrodes $a$ and $b$ of the mechanical rectifier circuit. Output lines 126 and 127 pass, from electrodes $a$ and $b$, through the series connected potentiometers 128 and 129. Variable taps 130 and 131 of the potentiometers pick off the differential signal of the rectifier circuit 69 and pass it through lines 132 and 133 to the input of amplifier 70, which may be of any suitable type.

The output of amplifier 70 is connected through lines 134 and 135 to two-phase motor 71 and drives it either direction, depending upon the polarity of the output voltage. Motor 71 is shafted through speed reducer 72 to rotary autotransformer 73, the output of which is connected through lines 136 and 137 across feedback filament 30 of the infra-red analyzer, thereby completing the null-balance energy feedback loop.

It, therefore, can be seen that, with no specific gas component in the sample gas cells, the analyzer can be zero-set by adjusting the energization of feedback filament 30 to give a total quantity of infra-red energy to the reference cell side of the analyzer which will give equal pressure in both measuring cells and thus no signal developed in the condenser microphone. However, when the specific gas component increases in the sample cells, there will be a pressure differential which will further detune the tank circuits and result in a voltage feedback to the feedback filament which will again balance the analyzer for that percentage of specific gas component in the sample gas. As the rotary autotransformer 73 rotates in response to the fed back signal, thereby restoring the system to a null balance condition, an angular rotation indicator 138, shafted thereto, also rotates to give a reading which can readily be calibrated in percentage of specific gas component of the sample gas. Therefore, the angular rotation indication gives a continuous indication of specific gas component of the sample gas.

Figure 7:
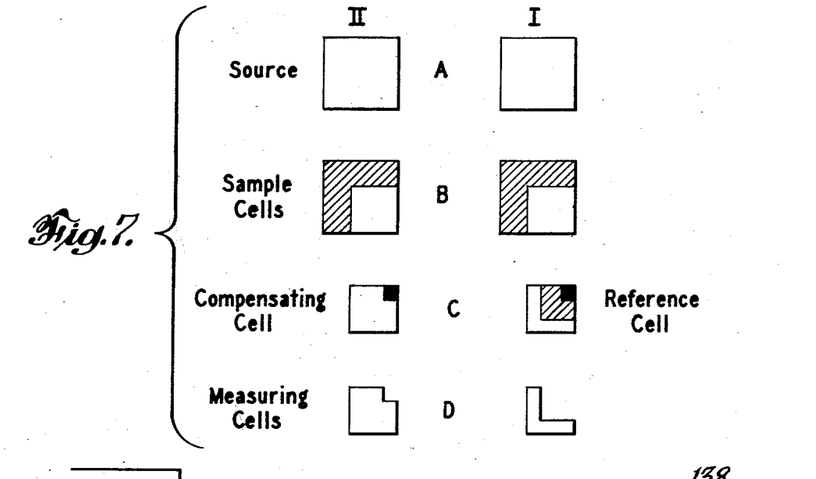
Fig. 7 is a schematic drawing illustrating the quantities of infra-red energy absorbed and transmitted through each body of gas in the two optical systems of the analyzer cell block of Fig. 1.

Fig. 7 of the drawings schematically illustrates the compensating balancing operation performed by the analyzer and method of analysis of the invention. Paths I and II indicate the quanta of infra-red energy absorbed by the specific gas at various stages in the two optical paths of the analyzer. Stage A represents the equal quanta of infra-red energy emitted from the sources in the two paths and which are capable of absorption by the specific gas. In stage B, the shaded area represents the equal quanta of infra-red energy absorbed by the specific gas component of the gas sample and by those other gas components which have overlapping spectra. The unshaded area represents the remaining quanta of energy absorbable by the specific gas which are available to the succeeding portions of the optical paths. In stage C, the shaded area in path I represents those quanta of infra-red energy absorbed by the specific gas component while the darkened portion of that shaded area represents that portion of the specific gas absorption which is common to contaminant gases in the sample gas which have overlapping absorption spectra with the specific gas. In stage C, the dark area in path II, identical with the dark area in path I, represents those quanta of energy in the absorption spectrum of the specific gas absorbed by a selected contaminant gas placed in the compensating cell to mask any response to variation in contaminant components in the sample gas. Stage D represents those quanta of energy arriving at the measuring cell under the above conditions, if energy were not fed back to establish a null balance condition.

The present invention has been successfully employed to analyze for specific components of a wide variety of infra-red absorbing gases in many gas mixtures containing other infra-red absorbing components. By way of example the following data sets forth one application:

A vaporized liquid sample, having the following percent by volume variation, was passed into the sample cells of an analyzer set to a 0–5 percent methane range:

*Table*

| Component | Percent by Volume Variation |
|---|---|
| $CH_4$ (methane) | 0.4–8.2 |
| $C_2H_6$ (ethane) | 51.1–66.6 |
| $C_3H_8$ (propane) | 26.1–34 |
| iso-$C_4H_{10}$ (iso-butane) | 1.5–4.0 |
| n-$C_4H_{10}$ (normal-butane) | 1.9–5.1 |
| n-$C_5H_{12}$ (normal-pentane) | 0.3–1.1 |

The two sample cells were connected in parallel and contained the above six components of the sample gas which continuously flowed therethrough. The reference cell contained 60% $CH_4$ + 40% nitrogen; the compensating cell contained 30% $C_3H_8$ + 70% nitrogen and both the measuring cells contained 50% $CH_4$ + 50% argon. Propane was employed as the sole compensating gas only because it was determined that absorption by propane was so intense and so overlapped all of the absorption bands of the ethane, butanes and pentane, that complete compensation for all of these contaminant component gases was attained when compensation for propane was effected. In the above-described application, adjustment was made of the phasing between the beams of chopped infra-red energy passing through the reference and compensating cells and a highly sensitive indication of the methane component was achieved.

What is claimed is:

1. In apparatus for continuously determining the quantity of a specific infra-red absorbing gas component in a gaseous mixture containing contaminant infra-red absorbing gases and employing source means for providing two substantially equal infra-red energy beams, a cell in the path of each of said energy beams for the continuous passage of said mixture therethrough, a reference cell in one of said energy paths containing at least a sensitizing quantity of said specific gas, a compensating cell in the other of said energy paths containing at least a filtering quantity of said infrared absorbing contaminant gases, and a measuring cell containing at least a quantity of specific gas in each of said energy paths for developing a variable differential pressure therebetween proportional to the quantity of said specific gas component in said mixture, the improvement which comprises providing means responsive to and operable to translate said variable differential pressure into a variable electric signal, and means responsive to said variable electric signal for feeding back energy to accomplish an increase or decrease in the infra-red energy in said energy path containing said reference cell, thereby maintaining a null-balance condition of operation.

2. Apparatus for continuously determining the quantity of a specific infra-red absorbing gas component in a gaseous mixture containing contaminant infra-red absorbing gases comprising, in combination, source means for providing two substantially equal infra-red energy beams, a cell in the path of each of said energy beams for the continuous passage of said mixture therethrough, a reference cell in one of said energy paths containing at least a sensitizing quantity of said specific gas, a compensating cell in the other of said energy paths containing at least a filtering quantity of said infra-red absorbing contaminant gases, a measuring cell containing at least a quantity of specific gas in each of said energy paths for developing a variable differential pressure therebetween proportional to the quantity of said specific gas component in said mixture, means responsive to and operative to translate said variable differential pressure into a variable electric signal, and means responsive to said variable electric signal for feeding back energy to accomplish an increase or decrease in infra-red energy in said energy path containing said reference cell, whereby a null-balance condition of operation is restored and maintained.

3. Apparatus for continuously determining the quantity of a specific infra-red absorbing gas component in a gaseous mixture containing contaminant infra-red absorbing gases comprising, in combination, source means for providing two substantially equal infra-red energy beams, a cell in the path of each of said energy beams for the continuous passage of said mixture therethrough, a reference cell in one of said energy paths containing at least a sensitizing quantity of said specific gas, a compensating cell in the other of said energy paths containing at least a filtering quantity of said infra-red absorbing contaminant gases, a measuring cell containing at least a quantity of specific gas in each of each energy paths for developing to variable differential pressure therebetween proportional to the quantity of said specific gas component in said mixture, means responsive to and operative to translate said variable differential pressure into a variable electric signal, means for periodically chopping said infra-red energy beams asynchronously to provide said electric signal as a pulsating electric signal, and means responsive to said variable pulsating electric signal for feeding back energy to accomplish an increase or decrease in infra-red energy in said energy path containing said reference cell, whereby a null-balance condition of operation is restored and maintained.

4. Apparatus in accordance with claim 3, wherein said infra-red energy is fed back through a feed-back filament in said energy path containing said reference cell and positioned between said sample gas cell and said infra-red energy beam chopper.

5. Apparatus in accordance with claim 4, wherein a dummy filament is provided in the other energy path to balance the interfering effect of said feed back filament in said infra-red energy path containing said reference cell, thereby providing two substantially identical optical paths.

6. Apparatus in accordance with claim 4, wherein a trimmer is provided in the other energy path to balance the interfering effect of said feed back filament in said infra-red energy path containing said reference cell, thereby providing two substantially identical optical paths.

7. In the method of analyzing for the quantity of a specific infra-red absorbing gas component in a gaseous mixture containing contaminant infra-red absorbing gases comprising, providing two substantially equal infra-red energy beams, continuously passing said mixture through cells one, positioned in the path of each of said energy beams, providing at least a sensitizing quantity of said specific gas in a reference cell positioned in one of said energy paths, providing at least a filtering quantity of said infra-red absorbing contaminant gases in a compensating cell in said other energy path, providing a quantity of specific gas in a measuring cell in each of said energy paths for developing a variable differential pressure therebetween proportional to the quantity of said specific gas component in said mixture, the improvement which comprises translating said variable differential pressure into a variable electric signal, and feeding back energy to accomplish an increase or decrease in the infra-red energy in said energy path containing said reference cell, thereby maintaining a null-balance condition of operation, and employing said quantity of fed back energy required to restore a null-balance condition as the measure of said quantity of specific infra-red absorbing gas component in said gaseous mixture.

8. Apparatus for determining the quantity of a specific infra-red absorbing gas component in a gaseous mixture containing contaminant infra-red absorbing gases comprising, in combination, infra-red energy source means capable of providing two substantially equal beams of infra-red energy along two energy paths, a cell in each of said energy paths for the passage of said gaseous mixture therethrough, a reference cell in one of said energy paths containing at least a sensitizing quantity of said specific gas, a compensating cell in the other of said energy paths containing at least a filtering quantity of said infra-red contaminant gases, a measuring cell containing a quantity of specific gas in each of said energy paths for developing a variable differential pressure therebetween proportional to the quantity of said specific gas component in said mixture, indicating means responsive to said variable differential pressure and calibrated to indicate the specific gas component of said gaseous mixture, and energy beam chopping means in each of said energy paths adapted to permit the dynamic adjustment of the relative phasing of the chopping of infra-red energy in said energy paths.

9. Apparatus for determining the quantity of a specific infra-red absorbing gas component in a gaseous mixture containing contaminant infra-red absorbing gases comprising, in combination, infra-red energy source means capable of providing two substantially equal beams of infra-red energy along two energy paths, a cell in each of said energy paths for the passage of said gaseous mixture therethrough, energy beam chopping means positioned in each of said energy paths after said cell for said gaseous mixture and adapted to permit the dynamic adjustment of the relative phasing of the chopping of infra-red energy in said energy paths, a reference cell in one of said energy paths containing at least a sensitizing quantity of said infra-red contaminant gases, a measuring other of said energy paths containing at least a filtering quantity of said infra-red contaminant gases, a measuring cell containing a quantity of specific gas in each of said energy paths for developing a variable differential pressure therebetween proportional to the quantity of said specific gas component in said mixture, means responsive to and operable to translate said variable pressure into a variable pulsating electric signal, and means responsive to said variable pulsating electric signal for feeding back energy to accomplish an increase or decrease in the infra-red energy in said energy path containing said reference cell, whereby a null-balance condition of operation is maintained.

10. In the method of analyzing for the quantity of a specific infra-red absorbing gas component in a gaseous mixture containing contaminant infra-red absorbing gases comprising, providing two substantially equal infra-red energy beams, continuously passing said mixture through cells one positioned in the path of each of said energy beams, providing at least a sensitizing quantity of said specific gas in a reference cell positioned in one of said energy paths, providing at least a filtering quantity of said infra-red absorbing contaminant gases in a compensating cell in said other energy path, providing a quantity of specific gas in a measuring cell in each of said energy paths for developing a variable differential pressure therebetween proportional to the quantity of said specific gas component in said mixture, and translating said variable defferential pressure into an electric signal which indicates the quantity of said specific gas component in said gaseous mixture, the improvement which comprises periodically chopping each of said infra-red energy beams to produce a pulsating variable differential pressure and dynamically adjusting the relative phasing of the chopping of infra-red energy in said energy paths to compensate for the effect of unequal absorption times of gases in said energy paths and produce a variable differential pressure in proper time-phase relation.

References Cited in the file of this patent

UNITED STATES PATENTS

| | | |
|---|---|---|
| 2,049,387 | Twombly | July 28, 1936 |
| 2,249,672 | Spanner | July 15, 1941 |
| 2,545,162 | Muly et al. | Mar. 13, 1951 |
| 2,668,243 | Williams | Feb. 2, 1954 |
| 2,683,794 | Briggs, et al. | July 13, 1954 |
| 2,688,090 | Woodhull et al. | Aug. 31, 1954 |
| 2,718,597 | Heigl et al. | Sept. 20, 1955 |
| 2,723,350 | Clapp | Nov. 8, 1955 |
| 2,754,424 | Woodhull et al. | July 10, 1956 |

OTHER REFERENCES

Kivenson et al.: "An Infra-Red Chopped-Radiation Analyzer," Journal of the Optical Society of America, vol. 38, No. 12, December 1948, pages 1086 to 1091.

UNITED STATES PATENT OFFICE
CERTIFICATE OF CORRECTION

April 19, 1960

Patent No. 2,933,600

Stanford B. Spracklen et al.

It is hereby certified that error appears in the printed specification of the above numbered patent requiring correction and that the said Letters Patent should read as corrected below.

Column 9, line 59, for "each", second occurrence, read -- said --; line 60, for "to variable" read -- a variable --; column 10, line 71, for "infra-red contaminant gases, a measuring" read -- specific gas, a compensating cell in the --.

Signed and sealed this 27th day of September 1960.

(SEAL)
Attest:

KARL H. AXLINE
Attesting Officer

ROBERT C. WATSON
Commissioner of Patents